US009604256B2

(12) United States Patent
Serjeantson et al.

(10) Patent No.: US 9,604,256 B2
(45) Date of Patent: Mar. 28, 2017

(54) INTELLIGENT MAIL RECOVERY TOOL

(71) Applicant: Logical Turn Services Inc., Markham (CA)

(72) Inventors: Kirk Serjeantson, Markham (CA); Adam Stevenson, Hamilton (CA); David Short, Ancestor (CA); Jim McLellan, Mississauga (CA)

(73) Assignee: Logical Turn Services Inc., Markham, Ontario (CA)

( * ) Notice: Subject to any disclaimer, the term of this patent is extended or adjusted under 35 U.S.C. 154(b) by 0 days.

(21) Appl. No.: 14/489,079

(22) Filed: Sep. 17, 2014

(65) Prior Publication Data

US 2015/0076043 A1 Mar. 19, 2015

Related U.S. Application Data

(60) Provisional application No. 61/878,715, filed on Sep. 17, 2013.

(51) Int. Cl.

| | |
|---|---|
| ***G06K 9/00*** | (2006.01) |
| ***B07C 3/14*** | (2006.01) |
| ***B07C 5/16*** | (2006.01) |
| ***B07C 5/342*** | (2006.01) |
| ***B07C 7/00*** | (2006.01) |

(52) U.S. Cl.

CPC .................. *B07C 3/14* (2013.01); *B07C 5/16* (2013.01); *B07C 5/342* (2013.01); *B07C 7/005* (2013.01); *B07C 2301/0025* (2013.01)

(58) Field of Classification Search

CPC .. B07C 5/16; B07C 5/165; B07C 5/18; B07C 5/005; B07C 3/14; B07C 2301/00; B07C 2301/0025; B07C 2301/0058

USPC .................. 209/583, 584, 900; 700/223–227

See application file for complete search history.

(56) References Cited

U.S. PATENT DOCUMENTS 7,336,177 B2 * 2/2008 Onderko ................ G06Q 10/08 700/224
2006/0020366 A1 * 1/2006 Bloom ...................... B07C 3/00 700/226
2007/0012603 A1 * 1/2007 Park .......................... B07C 3/14 209/584
2009/0114575 A1 * 5/2009 Carpenter ............... B07C 7/005 209/584
2014/0270356 A1 * 9/2014 Dearing .................... B07C 3/14 382/103

OTHER PUBLICATIONS

Bob Berwin and Linda Rosencrane, Follow that Package!, Computerworld, Mar. 19, 200, 8 pages.

* cited by examiner

*Primary Examiner* — Joseph C Rodriguez
*Assistant Examiner* — Kalyanavenkateshware Kumar
(74) *Attorney, Agent, or Firm* — Taft Stettinius & Hollister LLP

(57) ABSTRACT

A system and method for providing intelligent mail recovery are provided. A cart for receiving a bucket containing mail items provide a camera and scale on a frame for detecting movement of mail items and determining destination as well as an associated weight of the mail item. An indicator is provided to an operator of the system as to the destination of the mail item. The mail item can then be sorted to the appropriate sort location. The system provides the ability to efficiently sort mail in addition to being portable within a sorting facility.

20 Claims, 8 Drawing Sheets

INTELLIGENT MAIL RECOVERY TOOL

CROSS-REFERENCE TO RELATED APPLICATION

The application claims priority to U.S. Provisional Patent application No. 61/878,715 filed Sep. 17, 2013 the entirety of which is hereby incorporated by reference in its entirety for all purposes.

TECHNICAL FIELD

The present disclosure relates to mail sorting and in particular to high productivity weighing and sorting of mail items.

BACKGROUND

There are a number of systems used today that can reweigh mail in sorting application. In a static scale method a user has a scale, places the envelope of the scale, scans the barcode and sorts the mail and the weight and the barcode are sent to a computer and placed in a data file that is sent to the backend system for billing. This method is very slow productivity and includes many steps to complete the transaction. Any operator remediation process is very intrusive.

In automated mail sorters the mail piece travels over an in-motion scale and through an automated scanner. Automated mail sorters are extremely expensive and not practical for many applications. In a shelf based sort location system a bin is provided that the user removes mail from. A scanner scans the mail and a light to the proper sort destination lights up and when the mail is placed in the proper shelf it is weighed by a load cell. Sort location shelves can be expensive and require a load cell in each sort location shelf to obtain the weight of each shipment. The implementation can be expensive and not practical to sorting environments that require regular reconfiguration.

A reweigh system that uses a decrementing scale that marries a barcode with a package are also not but FIFO logic—first in, first out—is used where the scale triggers a transaction then waits for a scan, then through and time out sequence waits for any operator inputs. The process must proceed in a defined order or the information gets out of sequence potentially billing customers the wrong weight on the wrong package. This system is expensive, inaccurate and not an ergonomic solution.

Prior mail sorting solutions are expensive, slow, not ergonomic to the operator and/or inaccurate. Therefore there is a need for systems and methods that enable improved mail sorting and weighting.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with an aspect of the present disclosure there is provided a method of intelligent mail recovery comprising: identifying a barcode on a mail item as it is removed from a bucket supported within a frame, the barcode identified by a camera coupled to the frame positioned above a bucket; determining a weight of the mail item by a scale in the frame positioned beneath the bucket when the mail item is removed from a bucket; determining a destination of the mail item from the identified barcode; and identifying a sort location for the mail item to an operator based upon the determined destination.

In accordance with another aspect of the present disclosure there is provided an intelligent mail recovery system comprising: a cart for receiving a bucket containing a plurality of mail items; a camera positioned above the bucket for detecting barcode information associated with mail items as they are removed from the bucket; a scale positioned below the buckets for weighing the mail items; a processor for receiving an image from the camera for determining a destination associated with the barcode of the mail item and a weight of the mail item and associating the determined destination with the mail item and the determined weight to determine a sort location; and a display mounted on the cart and coupled to the processor for identifying the sort location to an operator associated with the removed item.

In accordance with still yet another aspect of the present disclosure there is provided a non-transitory computer readable memory containing instructions which when executed by a processor perform: identify a barcode on a mail item as it is removed from a bucket supported within a frame, the barcode identified by a camera coupled to the frame positioned above a bucket; determine a weight of the mail item by a scale in the frame positioned beneath the bucket when the mail item is removed from a bucket; determine a destination of the mail item from the identified barcode; and identify a sort location for the mail item to an operator based upon the identified destination.

Embodiments are described below, by way of example only, with reference to FIGS. 1-9. The intelligent mail recovery tool (iMRT) provides a low cost ergonomic mail sorting system and enables an operator to sort mail and prevents double handling of mail product. In the description the term mail item is used to describe letter, envelopes, packages, freight or shipping product. The mail items are typically small enough to be carried by hand and to fit in a mail bag. The iMRT is ergonomic in design and built to maximize space and provide portability if necessary and provide the ability to sort mail items to destination sort locations.

Figure 1B:
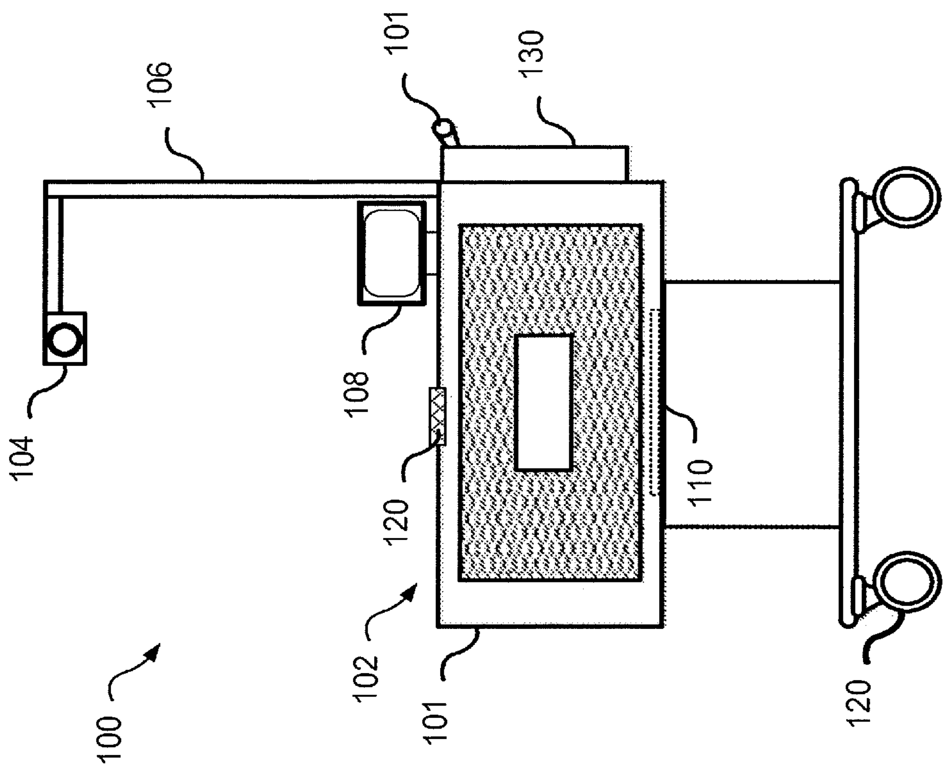
FIG. 1*a*-1*b* shows front and side views of an intelligent mail recovery tool mail distribution cart.
Figure 1A:
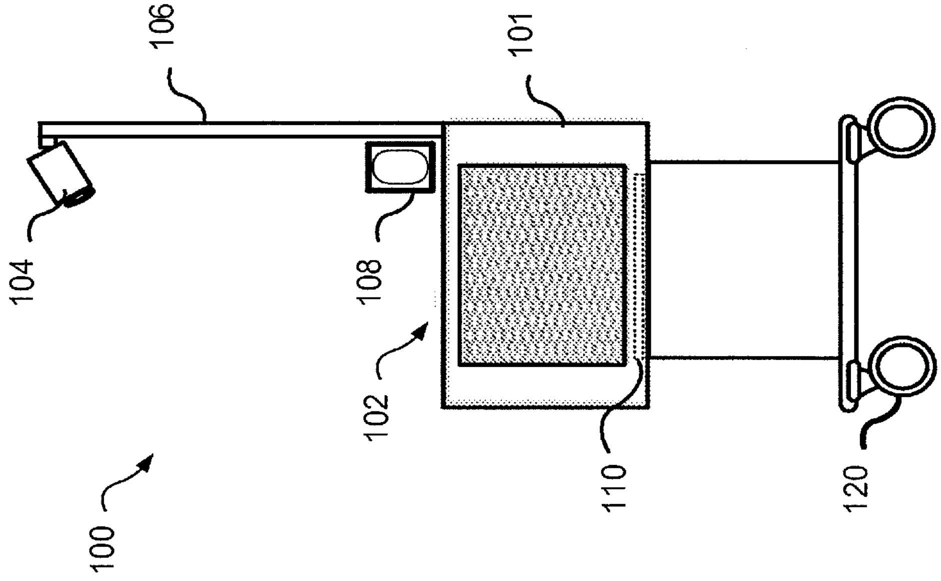
Figure 2D:
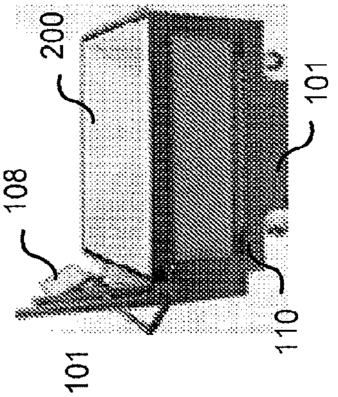
FIG. 2*a*-2*d* shows views of the intelligent mail recovery tool mail distribution cart.
Figure 2C:
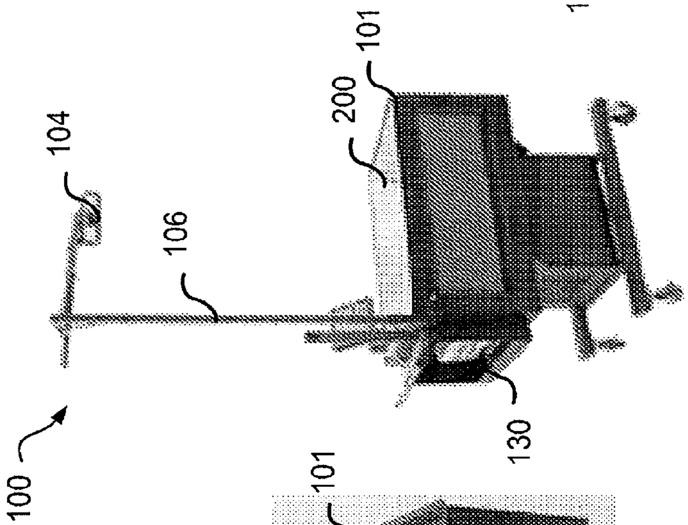
Figure 2B:
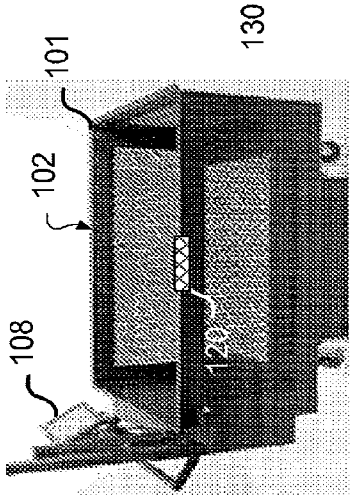
Figure 2A:
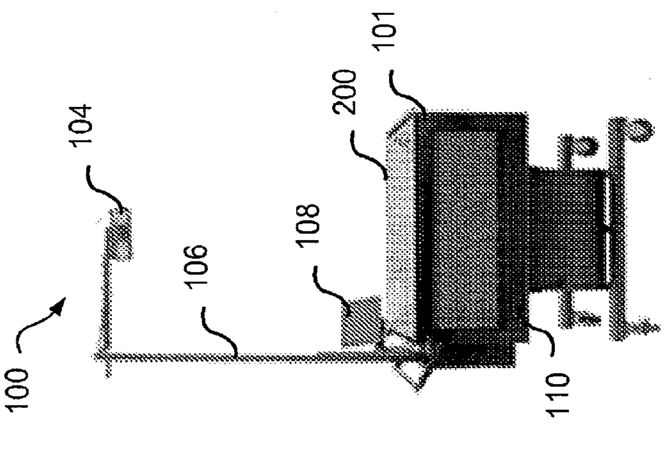
Figure 3A:
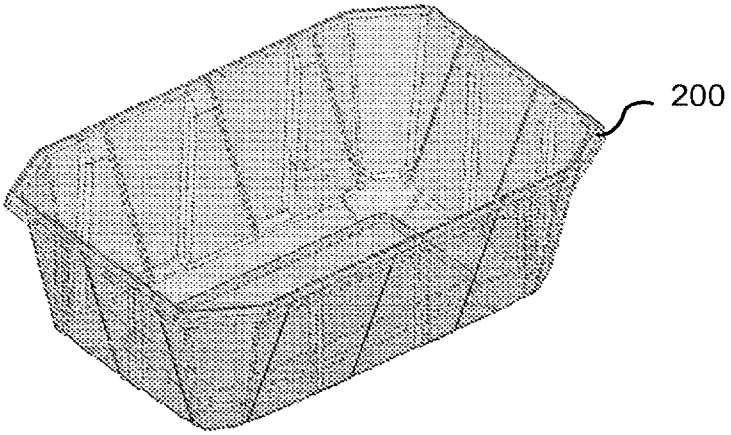
FIG. 3*a*-3*d* shows views of a bucket for the mail distribution cart.
Figure 3B:
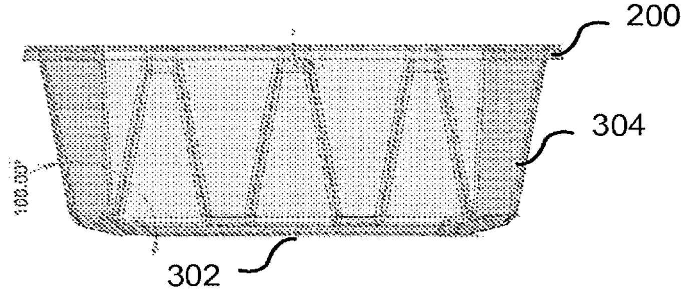
Figure 3C:
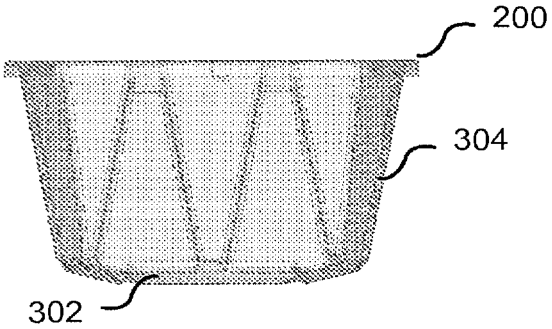
Figure 3D:
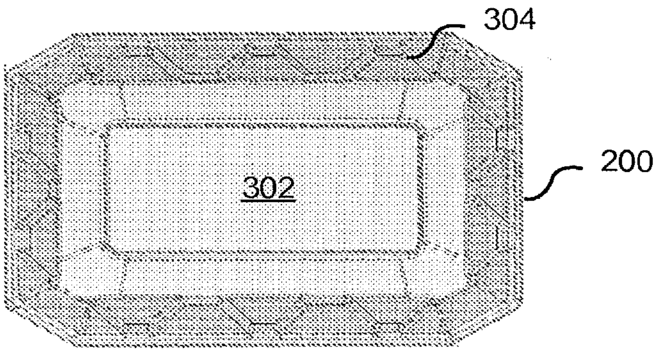

As shown in FIGS. 1(*a*)-1(*b*) the iMRT 100 provides mail distribution cart 101 provides a frame using a table design with an embedded mail receptacle 102 having a scale 101 therein for receiving a mail bucket containing mail items for sorting. The iMRT cart 101 may have wheels 120 attached to the frame to enable it to be moved easily within a sorting facility to different sort locations. A camera 104 is positioned by an arm 106 above the mail receptacle 102 for identifying and processing bar codes on mail items. As shown in FIGS. 2(*a*), 2(*c*) and 2(*d*) a bucket 200 is inserted within the mail receptacle 102 for holding mail items that require sorting. The bucket 200 rests on the scale 110 of the cart 101. The camera is facing toward the operator position on the side of the cart and has a field of view towards a position where mail items that are being removed from the cart will pass through. A computer is coupled to the camera and scale and identifies destinations of the mail items and associates a weight with the item. A small industrial touch screen 108 to the operator's right side is provide to display instructions, configuration and/or destination information to the operator. The screen 108 can be removed and installed on the left side of the system for left-handed operators. The ergonomic cart 101 is designed for the sorting of mail in any direction and provides ergonomic features such as adjustable height, providing controls within reach of the operator, and specifically designed bin to hold typical mail bag volume in an ergonomic bucket for easy access to mail items. The iMRT 100 can be utilized with external destination mail sorting racks that can provide an indication of the sort destination either by a light indicator or by an automated lid which opens in response to a determined destination for each mail item.

As shown in FIG. 1(*b*) and FIG. 2(*b*) the camera 104 utilizes a focus barcode 120 positioned on the cart that ensures optimal positioning and focus of camera 104. A computer 130 is integrated in the cart executing software instruction for processing images from the camera 104, receiving weight measurements and providing feedback to the user by the screen 108. The camera system 104 measures time between mail items processes to provide feedback to user and determine a destination associated with the mail item. The camera system 104 uses a focus bar code 120 to determine actual read rates against expected read rates where sub optimal rates of mail processing can be identified. The focus barcode 120 is a static constant barcode and the system can measure breaks between reads caused by movement of mail through the field of view of the camera 104. If the focus barcode 120 is broken longer during production that means the operator does not know where to sort that particular mail item to. If the barcode is reading too long during production that means that the sorter isn't moving as fast as he/she could and therefore is distracted or slow. Cart 101 includes an embedded scale 110 for the reweigh of mail. The scale 110 acquires package weight through a decrementing weight process. This iMRT 100 prevents double handling of mail creating a more efficient environment.

iMRT processing software is provided by the computer 130 positioned within or on the cart 101 and provides specific algorithms to prevent sequencing issues (First in first out sequencing problems eliminated) and provides feedback for process improvements. The software allows for sort assist for improved sorting. iMRT software that ensures the proper barcode is attached to the proper weight through an algorithm (avoids the FIFO issues in previous attempts). By leveraging the focus barcode, the software can calculate process improvements through analytics of timing on process steps.

iMRT 100 leverages a decrementing scale to determine the weight of the currently scanned mail item. The scale 110 is constantly taking measurements from the bin and sending to the PC 130. The scale 110 takes the difference in weight from the bin before and after a mail item is removed. For example, if the bin weighs 100 lbs and after a mail item is removed weighs 99 lbs, the system determines the piece weight to be 1 lb.

A focus barcode 120 is the hub of transactions within the system 100. The scan/imaging system is focused on this barcode with resides on the lip of the receptacle 102 on the operator side. The camera 104 is constantly reading the barcode to know if anything has been put in the field of view. If the read rate depreciates, meaning the time between good scans is reduced, the system sends an alert for the imager to be calibrated. When the scan is prevented this means a package is in the field of view signaling the initiation of a transaction. The system 101 is constantly polling a weight from the scale and the last decrement within a given time frame of the transaction will be used for the package weight. If no weight is given the system assumes the package is too light and assigns a weight of 0.01. The iMRT software leverages the hardware components to create the transaction data string.

The scanning information generated from the camera 104 can also be utilized to generate productivity information of the operator of the iMRT. The time between static barcode reads will indicate user productivity. For example using the time the barcode is blocked the system assumes the user is not sure where to sort the package in hand. The system will know what package was in hand given the barcode is being acquired by the camera 104. Post-shift an analysis can be done on what sort locations the operator needs to be trained on. The iMRT software is taking barcode reads and assessing when the transaction begins and ends and compiling the data string. As part of the software the user interface (UI) leverages any smart barcode or other embedded sort information to provide the user with a signal on where to sort the freight. The system takes the embedded sort information, translates and displays it on the screen 108 for the user to know where to sort. Additional motion or imaging sensors may be provided on the iMRT 100 to detect user movements and adjust processing or ergonomics of the system. Wearable devices may also be utilized to detect user identifier to enable tailored configurations to be implemented.

Alternatively, the system 100 can be equipped with a lid (not shown) for the bucket to provide incremental weighing function. Once the lid is placed on the bucket a sensor causes a change in the software to adapt the weighing functions. This allows for objects to be scanned via the barcode acquisition device and then placed on the scale to achieve a dead weight. The iMRT 100 will then take the barcode and weight and create a data string. The iMRT 100 can also take multiple pieces that are scanned and placed on the lid one at a time and determine the weight by the amount the weight is incremented from the previous piece. For example, if the first piece is placed on the lid and a barcode of 12345 are acquired and a weight of 5 lbs is acquired that is placed in the data string. If another piece is scanned and placed on the lid the weight acquired is the difference between the previous weight and the new weight. For example if the barcode acquired is 22345 and the weight achieved is 10 lbs, which includes the weight of the piece that is still on the lid, the weight of the second piece is 5 lbs (10 lbs (total weight)−5 lbs (piece 1 still on lid)=5 lbs (weight of the second piece).

FIG. 3(*a*)-3(*d*) shows views of a bucket for the mail distribution cart. FIG. 3(*a*) shows a perspective view of the bucket 200. FIGS. 3(*a*) shows a lengthwise side view and FIG. 3(*b*) shows an end view with a docking section or recess 302 in the bottom of the bucket 200 which can be received by the cart 101. The scale 110 of the cart 101 can contact the docking section 302. FIG. 3(*d*) shows a top view of the bucket 200. The sides 304 of the bucket 200 can slope inwards and provide contours to allow for easy access to the mail items. The bucket 206 is designed to hold the contents of one plastic mail bag. Alternative designs can be contemplated for the bucket, for example a straight sided bucket, a contoured bucket or a bucket with a spring loaded floor that rises as the mail is emptied from the bucket. The tension can be adjusted on the spring mechanism so the floor rises at different pressure levels. The bucket can provide with a increasing angled sided on the side opposite to the operator that pushes mail towards the operator to avoid strains and excessive bending and reaching. Alternatively the floor of the cart may be height adjustable based upon weight of the content of the bucket or may angle the bucket 200 towards one side of the cart 101.

Figure 4A:
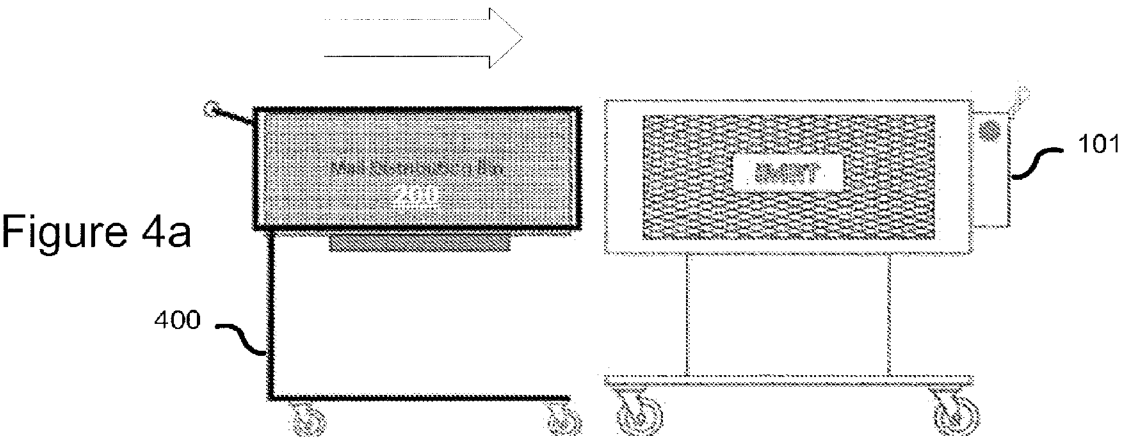
FIG. 4*a*-4*c* shows a bucket transfer system using the intelligent mail recovery tool mail distribution cart.
Figure 4B:
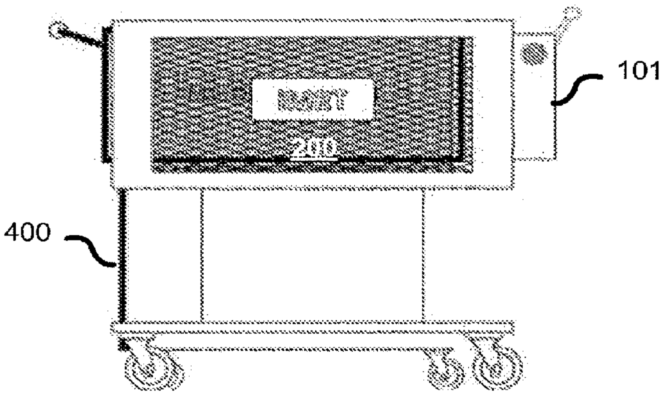
Figure 4C:
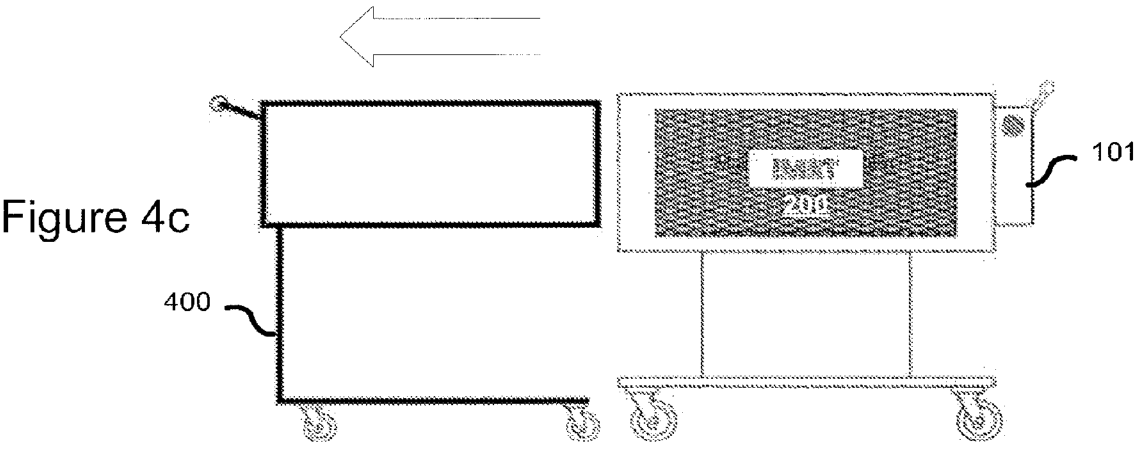

FIG. 4(*a*)-4(*c*) shows bucket transfer system using the iMRT mail distribution cart. The mail distribution system is a way to process the mail through iMRT 100 without double handling. Typically after drivers pick up mail items from a customer they will unload it into a bin, cage or bag and leave at the unload door for collection at a terminal. The bin/cage/bag is then picked up and moved to the sort location. As shown in FIG. 4*a* a mail distribution bucket 200 is provided in a transfer cart 400. The transfer cart 400 can dock with the iMRT 100 to transfer the bucket 200 and ensure the operator only unloads the mail once as shown in FIG. 4(*b*). The iMRT system 100 is modified to allow the cart 400 to be inserted into the front end of the cart 101 by providing arms with a hinge that fold upwards. The bucket 200 slides on the arms and when pushed onto the scale 110 the arms move up allowing the indent in the bucket 200 to settle over the scale 110 trapping the bucket 200 on the scale 110. When the cart 400 is pushed all the way into the cart 101 the bin on the mail distribution system cart "clicks" into the scale 110 so when the mail distribution system cart 400 is removed from cart 101 the bin 200 that was attached is now attached to the scale 110 and is ready to be processed. Transfer cart 400 pulls out as shown in FIG. 4(*c*). Another bin 200 can be added to the mail distribution system and brought back to the unload doors to be filled again.

Figure 5:
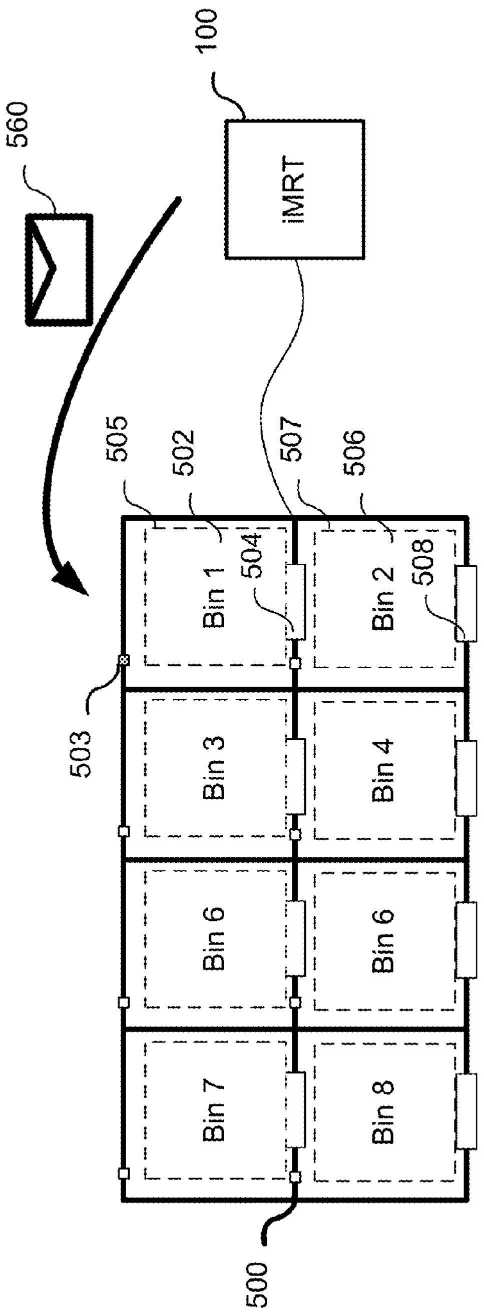
FIG. 5 shows a top view of a mail bag sort location.
Figure 6:
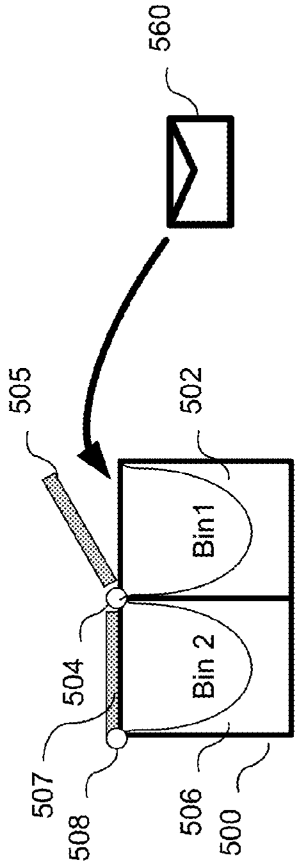
FIG. 6 shows a side view of a mail bag sort frame.

The iMRT system 100 can connect into a typical mail sort rack 500 as shown in FIGS. 5 and 6 to provide added mail sorting capability. Typical mail sorts are essentially plastic mail bags that are clipped onto a mail rack 500. A flip top system can be utilized that consists of motorized lids on each sort location. For example Bin 1 502 has a lid 505 controlled by a motor 504 that fit on the mail racks that hold the mail bag. Each lid 505 507 is assigned an ID that is referenced within the iMRT system 100 to a sort destination and associated with a bin or bag location. For example, ID 1 502 would be associated with Toronto, ID 2 506 would be associated with Montreal and ID 3 would be associated with Vancouver. When a package 560 is scanned through iMRT 100 and the destination barcode is scanned, if the package is destine for Toronto the iMRT software would send a signal to ID 1 502 and the lid 505 would open by motor 504 that is identified as ID 1 lid 505. This would indicate to the operator to put the package in the bag that is attached to the ID 1 lid 505 (in this case is destined for Toronto). ID 1 lid 505 would stay open until the next package is scanned. As soon as the next package is scanned ID 1 closes. If the next destination barcode reads Montreal ID 2 lid 507 would open by motor 508. The operator would be prompted via the open lid to sort the package to the ID 2 bag that is associated with Montreal. Once the operator sorts and picks up the next package and it is scanned the lid closes. If the next destination barcode reads Vancouver ID 3 opens. This process continues until all the packages have been sorted. The iMRT system 100 records the destination for each package for tracking purposes. Additionally or alternatively each location may have an indicator light 503 or system which is activated based upon the determined sort location. The iMRT 100 may be connected to the sort rack 500 by a cable connection or by a wireless connection. The flip top lid system may be added to existing rack systems.

The iMRT 100, when attached to the flip top system, can include a manual setting where a user can define the number of pieces and/or the amount of weight that would dictate a bag change. So if a user inputs 300 pieces as the piece capacity and 100 lbs as the weight capacity, when a sort destination hits that (using the reweight function and counting the sorted pieces from the flip top software) the systems creates an alert to the user to change bags. As part of this function the user can define over flow sort locations that automatically assign a destination based on capacity. In this case if the 300 piece limit is hit for all freight sorted to Vancouver the system will automatically assign Vancouver to one of the over flow locations so all Vancouver freight will now be sorted to that bag.

Operators can also be able to configure sort destinations via an application for their smart phone. Also, post-sort, the software can calculate the optimal bag setup for the next day based on historical information. Setup is based on weekly and seasonal trends. The system will know based on history that the most freight on Wednesday last year during peak season was sorted to Toronto. The Toronto sort location will automatically be put to the right front of the system. Optimal sort locations can be manually configured by the user or manager.

Figure 7:
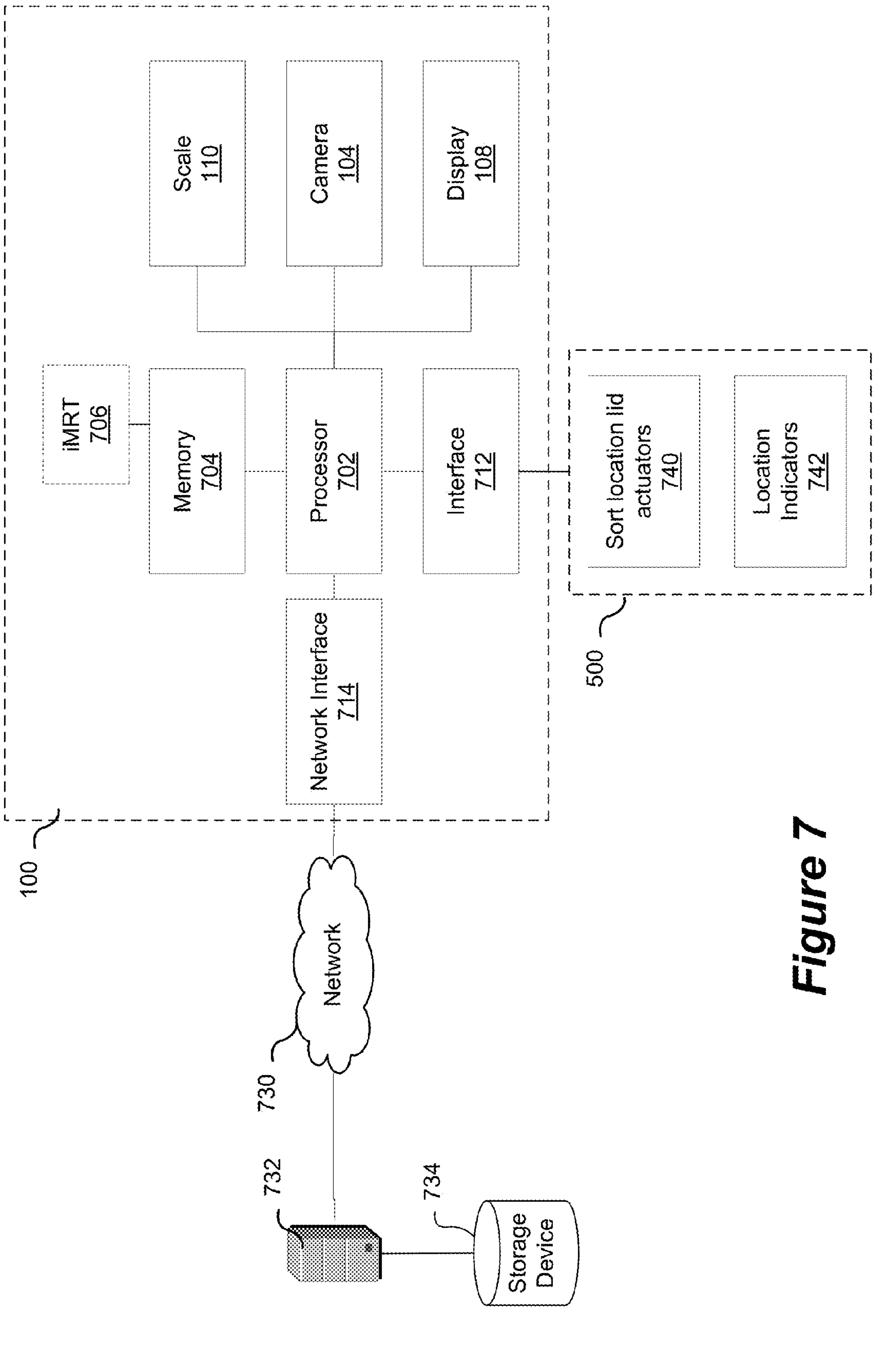
FIG. 7 shows a system diagram of the intelligent mail recovery tool.

FIG. 7 shows a system diagram of the intelligent mail recovery tool 100. The iMRT 100 integrates into the cart 101 a computer providing a processor 702 which interfaces with a memory 704 providing instructions 706 for the iMRT 100 functions. The processor 702 interfaces with a scale 110 in the bottom of the cart 101, a camera 104 and a display 108. An interface 712 can be provided to connect to external sort rack system 500 to control sort location lid actuators 740 and/or location indicators 742. The interface 712 may provide a wired or wireless connection to the sorting rack system 500. A network interface 714 may be provided to connect to a network 730 to access a server 732 having storage 734 for retrieving shipping information associated with the scanned mail barcodes and for receiving transaction data string of the scanned mail items. The network interface may be wired or wireless capable such as for example IEEE 802.3 or 802.11 standards or by other types of wireless technologies.

Figure 8:
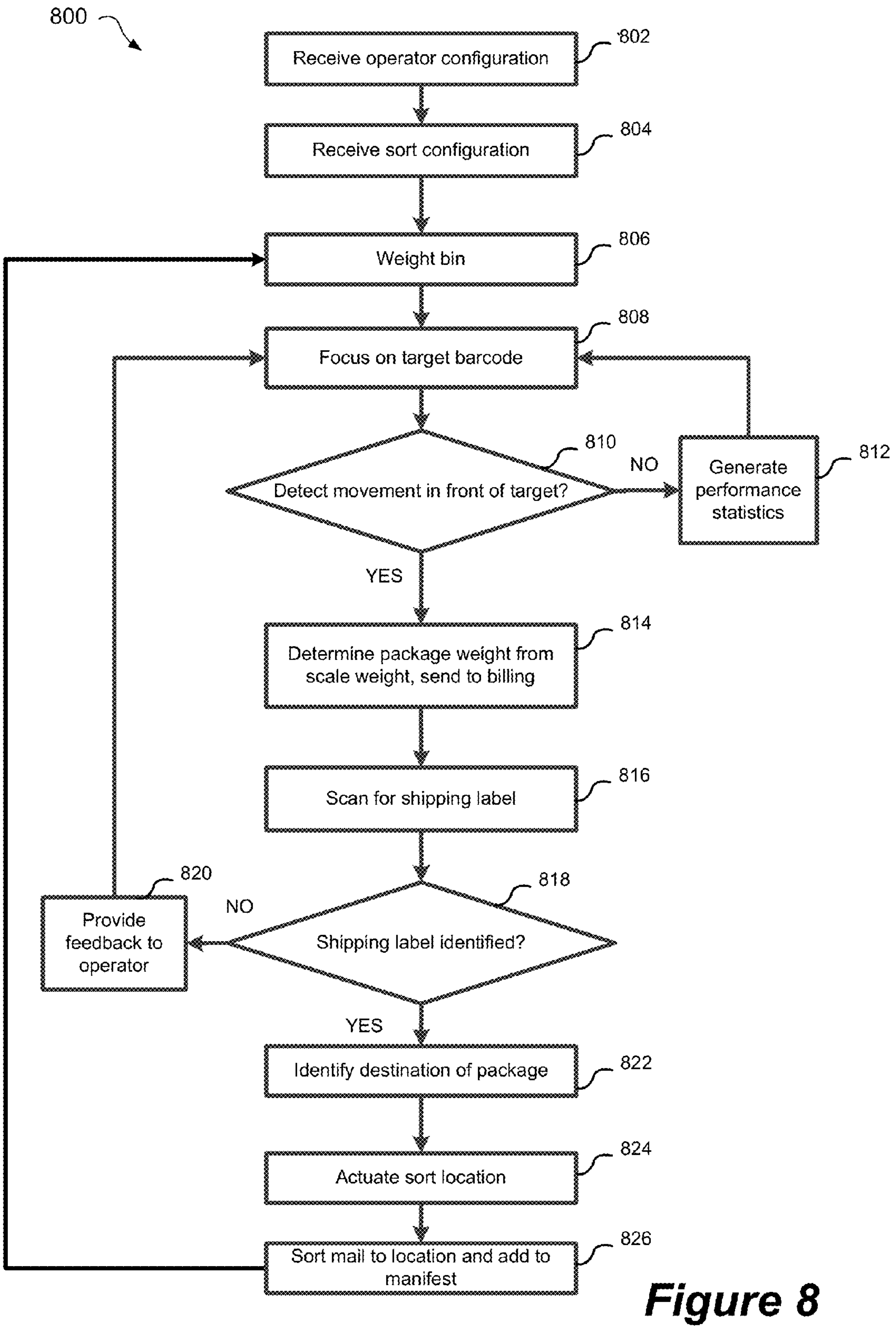
FIG. 8 shows a method of operation of an intelligent mail recovery tool.

FIG. 8 shows a method 800 of operation of an intelligent mail recovery tool. A configuration associated with the operator or user is determined by the iMRT system when the operator logs onto the system (802). If sort locations are configurable a sort configuration may be determined (804). The configuration of the system 100 or the configuration of the sort locations may be determined based upon the particular operator either by a login or by a wireless identification device such as for example near field communications (NFC), Bluetooth™ Low Energy (BLE) or Wi-Fi technologies. Alternatively the configuration may be based upon the type of mail being sorted or destinations associated with the mail being sorted. The system weights the bucket (806) to determine an initial weight value. The camera is focused on the target barcode (808) and when the operator takes a mail item from bucket the focus on the barcode is detected (810). Focus barcode process utilizes reads on the static barcode to determine operator efficiency. If the barcode is not read to optimal rates the user is alerted. All metrics are properly reset/started for production and movement signals start of transaction. As mail items are removed from the bucket they break the scanning of camera to the static focus barcode placed on the lip of cart on user side (YES at 810). If movement is not detected (NO at 810) performance feedback is generated related to the speed of mail processing (812), similarly statistics may be generated throughout the process to identify workflow issues. When a mail item is detected the system them takes difference from decrementing scale as calculated by system (814) and stores weight into transaction data record. The system takes the "most likely" fluctuation in scale measurement to determine package weight based on the decrementing weighing process. Acquisition of a barcode from camera is attempted (816). If a barcode is acquired (YES at 818) the barcode is entered into transaction record and sort location is determined from destination barcode (if applicable) (822). If a barcode is not identified (NO at 818) operator feedback is provided (820) via the screen on the cart. Identification of the sort location can be provided by a light or by opening a lid for a bin where package is to be sorted (if applicable) (824). If lids are utilized on a sort rack the lid is kept open until next transaction occurs. The mail is then sorted by the operator and manifest information can be updated to identify the location of the sorted mail item (826). The process continues until the bucket is removed and a new bucket is inserted in the cart.

If a distribution cart system is being utilized the process may be triggered when a bin from the distribution cart is inserted into the iMRT system through the loading mechanism as previously described. The iMRT system recognizes the insertion of the bin through the iMRT scale and does a quick zero of the scale and puts the software into operational mode.

The weighing process may also be performed by individually weighing each mail item based upon a lid on top of the bin rather than using a decrementing process. This system can weigh any type of small package mail item.

Figure 9:
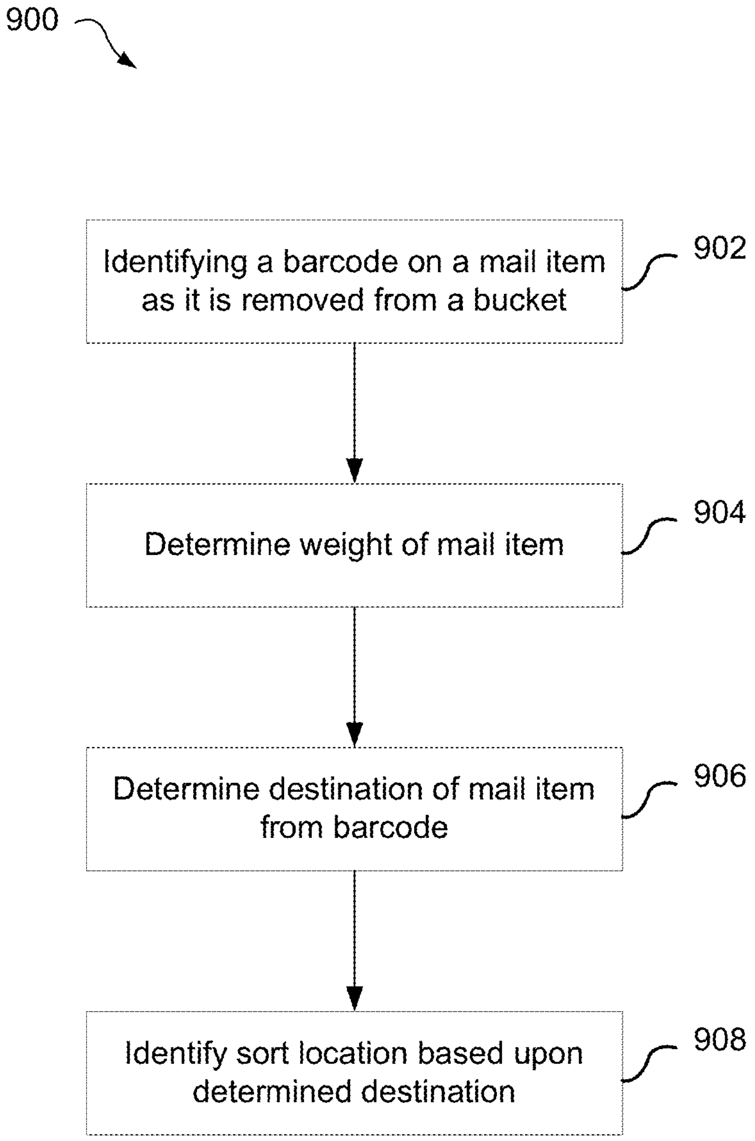
FIG. 9 show another method of operation of the intelligent mail recovery tool.

FIG. 9 show another method of operation of the intelligent mail recovery tool. The method 900 commences by identifying a barcode on a mail item as it is removed from a bucket supported within a frame, the barcode identified by a camera coupled to the frame positioned above a bucket (902) A weight of the mail item by a scale in the frame positioned beneath the bucket when the mail item is removed from a bucket is determined (904). A destination of the mail item from the identified barcode is determined (906). A sort location for the mail item to an operator based upon the identified destination is then identified (908).

It will be appreciated that not all possible embodiments have been described in detail. However, having regard to the current description, it will be appreciated how to modify the embodiments described in detail herein to provide the features and functionality of other possible embodiments. The devices, systems and methods described herein have been described with reference to various examples. It will be appreciated that systems, devices, components, methods and/or steps from the various examples may be combined together, removed or modified. As described the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

In some embodiments, any suitable computer readable memory can be used for storing instructions for performing the processes described herein. For example, in some embodiments, computer readable media can be transitory or non-transitory. For example, non-transitory computer readable media can include non-volatile computer storage memory or media such as magnetic media (such as hard disks), optical media (such as compact discs, digital video discs, Blu-ray™ discs, etc.), semiconductor media (such as flash memory, read only memory (ROM), Flash memory, electrically programmable read only memory (EPROM), electrically erasable programmable read only memory (EEPROM), etc.), any suitable media that is not fleeting or devoid of any semblance of permanence during transmission, and/or any suitable tangible media.

Although the description discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The invention claimed is:

1. An intelligent mail recovery system comprising:
- a cart for receiving a bucket containing plurality of mail items;
- a camera positioned above the bucket for detecting barcode information associated with mail items as they are removed from the bucket;
- a scale positioned below the bucket for weighing the mail items;
- a processor for receiving an image from the camera for determining a destination associated with a barcode of a mail item and a weight of the mail item and associating the determined destination with the mail item and the determined we ht to determine a sort location;
- a display mounted on the cart and coupled to the processor for identifying the sort location to an operator associated with the removed item; and
- a focus barcode positioned near an operator position of the cart, the camera directed toward the focus barcode wherein movement of mail items in front of the focus barcode trigger a weight measurement.

2. The intelligent mail recovery system of claim 1 wherein the processor is coupled to one or more motors for actuating a lid associated with a sort rack providing the sort location associated with the determined destination.

3. The intelligent mail recovery system of claim 1 wherein the processor is coupled to one or more indicator light for identifying a sort location associated with the determined destination.

4. The intelligent mail recovery system of claim 1 wherein the cart further comprises wheels for moving the cart.

5. The Intelligent mail recovery system of claim 1 wherein the cart can receive the bucket from a transfer cart, the transfer cart fitting within the cart to place the bucket on the scale within the cart.

6. The intelligent mail recovery system of claim 1 further comprising a network interface for communicating with a server to determine a sort destination associated with the barcode and receiving the sort location.

7. The intelligent mail recovery system of claim 1 further comprising a removable lid positioned on top of the bucket wherein when the lid is in position a weight value can be determined by placing the mail item on the lid.

8. The intelligent mail recovery system of claim 1 wherein the bucket has an indentation on a bottom surface for interfacing with the scale positioned within the cart.

9. The intelligent mail recovery system of claim 1 wherein a height of the bucket is adjusted based upon the weight of the bucket within the cart by a spring.

10. The intelligent mail recovery system of claim 1 wherein determining the destination by the processor comprises:

identifying the barcode on the mail item as it is removed from the bucket, the barcode identified by the camera;

determining the weight of the mail item from the scale when the mail item is removed from a bucket;

determining the destination of the mail item from the identified barcode; and identifying the sort locataion for the mail item to the operator based upon the determined destination.

11. The intelligent mail recovery system of claim 10 wherein determining the weight of the mail item further comprises determining a weight of the bucket and associate a decremented weight value from a bucket weight with the mail item.

12. The intelligent mail recovery system of claim 10 wherein identifying the sort location of the mail item comprises actuating a motor to open a lid of a sort bin associated with the identifying location.

13. The intelligent mail recovery system of claim 12 wherein the lid remains open until a next mail item is detected.

14. The intelligent mail recovery system of claim 10 wherein identifying the sort location of the mail item comprises actuating a light associated with the identified location.

15. The intelligent mail recovery system of claim 10 further comprising generating one or more operational statistics based upon movement of mail items in front of the focus barcode.

16. The intelligent mail recovery system of claim 10 wherein the camera constantly reads the focus barcode to determine if anything has been put in a field of view of the camera wherein if a read rate depreciates an alert for the camera to be calibrated is generated.

17. The intelligent mail recovery system of claim 16 wherein when identification of the focus barcode is prevented by a mail item in a field of view a transaction is initiated.

18. The intelligent mail recovery system of claim 17 wherein a weight from the scale is constantly polled and a last decrement within a given time frame of a transaction is used for the mail item weight and if no weight is given it is assumed that the mail item is too light and assigns a weight of 0.01.

19. The intelligent mail recovery system of claim 17 wherein a time between static barcode reads indicate user productivity which is used to generate one or more statistics associated with operator performance.

20. The intelligent mail recovery system of claim 10 wherein the camera is activated when a bucket is placed within a frame of the cart.

* * * * *